United States Patent [19]

Zelinski

[11] 4,104,332

[45] Aug. 1, 1978

[54] COUPLING OF ALKALI METAL-TERMINATED POLYMERS

[75] Inventor: Robert P. Zelinski, Bartlesville, Okla.

[73] Assignee: Phillips Petroleum Company, Bartlesville, Okla.

[21] Appl. No.: 777,218

[22] Filed: Mar. 14, 1977

Related U.S. Application Data

[62] Division of Ser. No. 678,097, Apr. 19, 1976, Pat. No. 4,039,633.

[51] Int. Cl.$^2$ .......................... C08F 8/04; C08F 8/18; C08F 8/00
[52] U.S. Cl. ................ 260/880 B; 260/879; 526/20; 526/21; 526/25; 526/26; 526/46
[58] Field of Search ............... 526/20, 21, 25, 26, 526/46; 260/879, 880 B

[56] References Cited

U.S. PATENT DOCUMENTS

| | | | |
|---|---|---|---|
| 3,135,716 | 6/1964 | Uraneck et al. | 260/45.5 |
| 3,177,190 | 4/1965 | Hsieh | 260/94.2 |
| 3,281,383 | 10/1966 | Zelinski et al. | 260/23.7 |
| 3,506,639 | 4/1970 | Halosa | 526/46 |
| 3,810,877 | 5/1974 | Doss | 526/46 |
| 4,039,633 | 8/1977 | Zelinski | 260/879 |
| 4,049,753 | 9/1977 | Moczygemba | 260/880 B |

*Primary Examiner*—William F. Hamrock

[57] ABSTRACT

Alkali metal-terminated polymers of one or more alkadienes and of one or more vinyl-substituted aromatic monomers are effectively coupled by a di-, tri-, or tetra carboxylic acid halide of substituted or unsubstituted benzene.

9 Claims, No Drawings

COUPLING OF ALKALI METAL-TERMINATED POLYMERS

This is a divisional application of patent application Ser. No. 678,097 filed Apr. 19, 1976, now U.S. Pat. No. 4,039,633.

This invention relates to novel coupled polymers. In one of its more specific aspects, this invention relates to a process for the production of such coupled polymers. Another aspect of this invention relates to the coupling of alkali metal-terminated polymers.

BACKGROUND OF THE INVENTION

The coupling of alkali metal-terminated polymers such as lithium-terminated polymers is a process known in the art. In accordance with this known process, an alkali metal-terminated polymer is treated with a compound having two or more functional groups containing two or more reactive sites capable of reacting with the cabon-alkali metal bonds of this alkali metal-terminated polymer. The multifunctional coupling agent thereby becomes a nucleus for the resulting structure. From this nucleus long-chain polymer branches radiate and such coupled polymers have specific properties that render them useful for particular applications.

Coupled polymers that are derived from coupling agents possessing three or more reactive sites are frequently called radial polymers. Such radial polymers have been of particular interest because of their increased Mooney viscosity, improved processability, and reduced cold flow as compared to the uncoupled or parent polymers. Hydrogenation of the alkadiene-based radial polymers have received considerable attention in recent years because the hydrogenation of such polymers increases the resistance of such polymers to environmental attach, e.g., oxygen and/or ozone deterioration.

It has, however, been found that some of these radial polymers are not sufficiently stable under hydrogenation conditions. More specifically, it has been found that radial polymers that have a connection between an inorganic atom and the first carbon atom of the parent polymer chain sometimes are not as stable as radial polymers in which the connection between the coupling agent and the polymer is a carbon-carbon bond. If this cleavage of the bond between the inorganic atom of the coupling agent and the carbon atom of the polymer chain occurs, the hydrogenated radial polymer is admixed with hydrogenated but no longer coupled polymer chains. This effect can impair the properties of the coupled polymer. Therefore, it would be desirable to have a coupling agent available which does not contain inorganic atoms connected to the active sites of the coupling agent and at the same time achieves a high degree of coupling efficiency.

THE INVENTION

It is thus one object of this invention to provide novel coupled polymers.

Another object of this invention is to provide a process for the production of polymers that can be effectively hydrogenated without adverse effect on the coupled polymer.

A further object of this invention is to provide a process to produce hydrogenated polymers.

Still another object of this invention is to provide a process for coupling alkali metal-terminated polymers.

Yet another object of this invention is to provide a novel coupling agent.

These and other objects, features, details and advantages of the present invention will become apparent to those skilled in the art from the following detailed description of the invention and the appended claims.

In accordance with this invention, I have now found that a compound having the formula $$A(COX)_n R_{6-n}$$

wherein A is a benzene ring, the radicals X, which can be the same or different, are halogen, $n$ is 2, 3 or 4, the radicals R which can be the same or different, are hydrogen or hydrocarbyl radicals of 1–6 carbon atoms, the total number of carbon atoms in all radicals R being between 0 and about 10, is an effective coupling agent for coupling alkali metal-terminated polymers. The radical R is preferably selected from the group consisting of hydrogen, methyl, ethyl and n-propyl.

In accordance with one embodiment of this invention, there is therefore provided a coupled polymer having the formula $$A(Y')_{n-1} YR_{6-n} \qquad (I)$$

In this formula all the radicals Y, Y' and R are attached to ring carbon atoms of the benzene ring A. The radicals Y', which can be the same or different, are selected from the group of radicals consisting of —Y and $$\begin{matrix} O \\ \| \\ -C-OR'', \end{matrix}$$

the radical —Y is represented by the following formulae:

$$\begin{matrix} OH \\ | \\ -C-Z \\ | \\ Z \end{matrix} \qquad (II)$$

or $$\begin{matrix} O \\ \| \\ -C-Z \end{matrix} \qquad (III)$$

A, R and $n$ have the meaning as defined above in connection with the coupling agent. R" is either hydrogen or a hydrocarbyl radical having 1–10 carbon atoms. Preferably R" is hydrogen or an alkyl radical with 1–6 carbon atoms. Z represents a homopolymer chain or a copolymer chain obtained by the polymerization of at least one alkadiene having 4–12 carbon atoms and/or by the copolymerization of at least one alkadiene having 4–12 carbon atoms and at least one monovinylarene having 8–18 carbon atoms per molecule, wherein the vinyl radical is attached to an arene ring carbon atom. These polymer chains Z can be either unhydrogenated or they can be hydrogenated to an extent that at least a portion of the olefinic unsaturation thereof is removed by this hydrogenation. The polymers of this invention are further characterized by the provision that at least 160 polymer or copolymer chains Z are present in 100 molecules of the formula (I). In the embodiment of the hydrogenated polymers, preferably 30 to 99% of the olefinic unsaturation of the polymer are removed by hydrogenation. A, R and $n$ have the same meaning as defined above in connection with the coupling agent.

The preferred group of acyclic conjugated alkadienes that can be polymerized into the polymer chain Z are those containing 4–8 carbon atoms. Examples for such alkadienes are 1,3-butadiene, 2,3-dimethyl-1,3-butadiene, piperylene, 3-butyl-1,3-octadiene, isoprene, 2-phenyl-1,3-butadiene.

Monovinylarenes that can be polymerized together with the alkadienes to form the polymer chain Z preferably are those selected from the group of styrene, the methylstyrenes, particularly 3-methylstyrene, the propylstyrenes, particularly 4-propylstyrene, vinylnaphthalene, particularly 1-vinylnaphthalene, cyclohexylstyrenes, particularly 4-cyclohexylstyrene, p-tolylstyrene, and 1-vinyl-5-hexylnaphthalene.

The polymer chains Z can be homopolymers of the alkadiene monomers defined or can be copolymers of alkadiene monomers and monovinyl-substituted aromatic monomers. These copolymers, in turn, can be random or tapered copolymers, as well as block copolymers of these various monomers. The presently preferred monomers are 1,3-butadiene and styrene. The presently preferred polymer chains Z are those in which the conjugated dienes are present in a major amount and the monovinyl-substituted arenes are present in a minor amount.

Those radicals Y' that result from the reaction of a

group with a terminating agent, preferably are those obtained by the reaction of this group with water or alkyl alcohols having 1–6 carbon atoms. The corresponding Y' groups, therefore, preferably are selected from the group consisting of carboxy and alkoxycarbonyl groups, the alkoxy radical of which has 1–6 carbon atoms. This can be expressed also by the statement that the Y' groups containing no polymer chains are

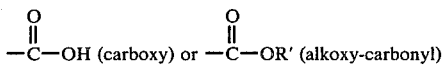

wherein —OR' is an alkoxy radical having 1 to 6 carbon atoms.

The presently preferred polymer is one that is obtained by coupling a living alkali metal terminated polymer selected from the group consisting of homopolymers of alkadienes having 4 to 12 carbon atoms and copolymers of at least one alkadiene of 4 to 12 carbon atoms and at last one monovinyl-substituted arene of 8 to 18 carbon atoms.

The molecular weight of the polymers of this invention can vary in broad ranges. For the usual applications of the coupled polymers, the weight average molecular weight will be in the range of about 10,000 to about 2,000,000.

Those polymers in which the polymer chain Z has a structure A'—B'— so that B' is attached to the coupling agent, and in which A' represents a block of monovinylarenes, preferably a polystyrene block, and B' represents a block that confers rubbery properties to the polymer chain, such as a polyalkadiene block, a copolymer block of an alkadiene and a monovinyl-substituted arene, or a combination of such blocks constitutes a presently preferred polymer. Such a polymer exhibits properties both of an elastomer and of a thermoplastic polymer. Therefore, such polymers can be formed into articles by standard procedures known for producing articles from thermoplastic polymers while the finished article exhibits elastomeric properties.

Furthermore, specific polymers constituting preferred embodiments of this invention are those obtained by reactions and procedures disclosed in detail in the following description of a process to make these polymers.

In accordance with another embodiment of this invention, there is provided a process for making the polymers defined above which comprises a coupling reaction between a living polymer having the formula M—Z and a coupling agent as defined above, wherein M is an alkali metal and Z is as described above.

The quantity of coupling agent employed with respect to the quantity of living polymers M—Z present depends largely upon the degree of coupling and the properties of the coupled polymers desired. Preferably the coupling agent defined above will be employed in a range of about 0.1 to about 1.5 equivalents of coupling agent based upon the alkali metal present in the polymer. In other words, the coupling agent is employed in a quantity so that about 0.1 to about 1.5 halogen atoms X are present per atom alkali metal M in the living polymer mixture. Using about 1 equivalent of coupling agent per equivalent of alkali metal present, results theoretically in an n-chain polymer, i.e., $n$ polymer chains coupled together through the coupling agent residue.

Examples for the coupling agent defined above are substituted and unsubstituted terephthaloyl dihalides, phthaloyl dihalides, isophthaloyl dihalides, 1,3,5-benzene tricarboxylic acid trihalides and 1,2,4,5-benzene tetracarboxylic acid tetrahalides. Specific examples for the coupling agent are terephthaloyl dichloride, phthaloyl dibromide, 1,3,5-benzenetricarboxylic acid trichloride, 2-methyl-6-ethyl-1,3,5-benzenetricarboxylic acid triiodide, and 2-methyl-1,3,5-benzenetricarboxylic acid trifluoride, tribromide, and trichloride, and 1,2,4,5-benzene tetracarboxylic acid tetrachloride.

The temperature at which the coupling reaction is carried out can vary over a broad range and, for convenience, often is the same as the temperature of polymerization. Although the temperature can vary broadly from such as 0° to 150° C, it will preferably be within the range from about 20° to 100° C.

The coupling reaction is normally carried out by simply mixing the coupling agent, neat or in solution, with the living polymer solution. The reaction period is usually quite short. The normal duration of the coupling reaction will be in the range of 1 minutes to 1 hour. Longer coupling periods may be required at lower temperatures.

After the coupling reaction, the coupled polymers are recovered by treating the reaction mixture with terminating agents containing active hydrogens such as alcohols or water or aqueous acid solutions or mixtures thereof. It is usually preferred to add an antioxidant to the reaction mixture before isolation of polymer.

The polymer is separated from the reaction mixture by standard techniques, such as steam stripping or coagulation with a suitable non-solvent such as an alcohol. The coagulated or stripped polymer is then removed from the resulting medium by, e.g., filtration. Residual solvent and other volatiles can be removed from the isolated polymer by heating, optionally under reduced pressure or in a forced air flow.

Compounding ingredients such as fillers, dyes, pigments, softeners and reinforcing agents can be added to the polymer during compounding operations.

In accordance with a further embodiment of this invention, there is provided a process for producing the polymers as defined above. This process includes basically two steps. The first step is the step in which a living polymer having the formula M—Z is produced. The second step is that in which this living polymer is coupled with the coupling agent of this invention as defined above.

The first step of this process is carried out by reacting a monofunctional alkali metal initiator system with the respective monomer or monomers to form the living polymer chain M—Z. This polymerization step can be carried out in one step or in a sequence of steps. In the case where the polymer chain Z is a homopolymer or a random or tapered copolymer of two or more monomers, the monomers are simultaneously polymerized with the alkali metal initiator. In the case where the polymer chain Z is a block copolymer comprising two or more homo- or copolymer blocks, these individual blocks can be generated by incremental or sequential monomer addition.

The monomers that are generally employed, as well as the monomers that are preferably used have been defined above in connection with the novel polymers of this invention. These monomers are also preferred for the process of the present invention.

Whereas several alkali metal-based initiator systems can be used in the first step of the process to make the coupled polymers of this invention, those that are based on lithium having the general formula R'''Li wherein R''' is a hydrocarbyl radical of 1 to about 20 carbon atoms are presently preferred. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexylbutyllithium. The amount of the alkali metal initiator employed depends upon the desired properties of the polymer, particularly the desired molecular weight. Normally the organomonolithium initiator is employed in the range of about 0.1 to 100 gram millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having 4–10 carbon atoms or a mixture of such diluents. Examples for the diluent are n-hexane, n-heptane, 2,2,4-trimethylpentane, cyclohexane, benzene and toluene. The reaction is generally carried out with a weight ratio of diluent to monomers exceeding 1. Preferably the diluent is employed in a quantity between about 400 to about 1500 parts by weight per 100 parts by weight of total monomers.

The polymerization reaction is step 1 usually occurs within a period of time ranging from a few minutes up to about 6 hours. Preferably, the reaction is carried out within a time period of about 10 minutes to about 2 hours. The polymerization temperature is not critical and will generally be in a range of about 15° to about 150° C, preferably in a range of about 40° to about 90° C.

At the conclusion of the polymerization in order to carry out the second or coupling step, the polymerization mixture is blended with the coupling agent. This is done before any material that would terminate the polymerization reaction and that would remove the alkali metal atom from the polymer chain is added to the reaction mixture. Thus the blending of the polymerization mixture and the coupling agent is carried out before any material such as water, acid or alcohol, is added to inactivate the living polymer. The second step of coupling the living polymer is thus carried out as described in detail above.

Various materials are known to be detrimental to the alkali metal-initiated polymerization. Particularly, the presence of carbon dioxide, oxygen and water should be avoided during on organomonolithium-initiated polymerization reaction of step 1 of this combined process for making the coupled copolymers. Therefore, it is generally preferred that the reactants, initiators and the equipment be free of these materials and that the reaction is carried out under an inert gas such as nitrogen.

In accordance with still a further embodiment of this invention, there is provided a process for the production of polymers in accordance with the formula defined above in wich the polymer chain substituents Z are at least partially hydrogenated such as to remove at least a portion of the olefinic unsaturations in the polymer chains Z, which comprise alkadiene-derived units. This process basically encompasses three steps, namely a first step jfor producing a living polymer, a second step for coupling the living polymer and a third step for hydrogenating the coupled polymer. The first and second steps have been described in detail above and the preferred embodiments of these steps disclosed above also are preferred embodiments for this combined process for producing a hydrogenated copolymer.

The third step of hydrogenating the coupled copolymer is carried out by blending the coupled polymer solution with a hydrogenation catalyst and free hydrogen under hydrogenation conditions. Examples of hydrogenation catalysts include nickel on Kieselguhr, Raney nickel, copper chromite, mylbdenum sulfide, platinum group metals, carboxylates and alkoxides of nickel and/or cobalt reduced by trialkyl aluminum. More specifically and in accordance with further preferred embodiments, this third or hydrogenation step is generally carried out as shown in the following table:

| Ranges for Hydrogenation Step Features | | |
|---|---|---|
| | Usually Employed | Preferred Range |
| Hydrogenation catalyst, php[a] | 0.05 to 20 | 0.1 to 2 |
| Hydrogenation temperature | 0 – 250° C | 10 – 200° C |
| Hydrogen | 35 to 35,000 kPa | 70 to 3500 kPa |
| Hydrogenation time | 1 min. to 25 hrs. | 10 min. to 10 hrs. |

[a]Parts by weight per 100 parts by weight polymer.

In this embodiment of the invention, the recovery of the polymer is carried out after the hydrogenation. Antioxidantsusually are added to the polymer solution. The hydrogenation catalyst is normally removed by filtration after which the hydrogenated polymer is recovered by, e.g., steam stripping or alcohol coagulation and subsequent filtration.

The polymers of this invention can be used in the fabrication of hoses, belting, extruded or molded goods and in formulating adhesives for both solution and hot melt techniques for diverse applications including those in the building construction, transportation, radical and household article fields.

The present invention will still be more fully understood from the following examples which illustrate preferred embodiments of the invention but are not intended to limit the scope thereof.

EXAMPLE I

A living lithium-initiated polybutadiene was produced by polymerizing butadiene using cyclohexane as a diluent and secondary butyllithium as the initiator. Two runs were carried out with different quantities of tetrahydrofuran present and different polymerization times. The polymerization was carried out at a temperature of 70° C. The recipe and other variables are shown in the following table:

| RECIPE | | phm[a] | mhm[b] |
|---|---|---|---|
| 1,3-Butadiene | | 100 | |
| Cyclohexane | | 760 | |
| Tetrahydrofuran (THF) | Run 1 | 0 | |
| | Run 2 | 4 | |
| sec-Butyllithium[c] | | | 2.6 |
| Polymerization time (min.) | Run 1 | 50 | |
| | Run 2 | 5 | |

[a]Parts by weight per 100 parts by weight polymer.
[b]Gram millimoles per 100 grams monomer.
[c]Effective amount, i.e., that beyond scavenger requirement.

The polymerizations were carried out by standard bottle techniques.

EXAMPLE II

To the polymerization mixtures, obtained in Example I, 0.667 mhm of 1,3,5-benzenetricarboxylic acid trichloride was added. The mixture was stirred at 70° C throughout the coupling period of 30 minutes. The products were isolated by isopropyl alcohol coagulation and vacuum drying.

The polymers obtained were evaluated and the results thereof are shown in the following table.

TABLE

| Run No. | Conversion wt.% | ML-4[a] at 212° F | Mol. wt. × 10⁻³[b] | | Inh. Vis.[c] | | Coupling[f] | | Gel[d] wt.% |
|---|---|---|---|---|---|---|---|---|---|
| | | | $M_w$ | $M_n$ | Coupled | Parent | Effic.% | Degree | |
| 1 | 100 | 48.5 | 505 | 231 | 1.75 | 0.84 | 84 | ~7 | —[e] |
| 2 | 100 | 46.5 | 1,563 | 354 | 1.69 | 0.77 | 88 | 6+ | 0 |

[a]ASTM D 1646-63.
[b]$M_w$, weight average molecular weight, and $M_n$, number average molecular weight, both of the coupled polymer, were determined by gel permeation chromatography in accordance with G. Kraus and C. J. Stacy, J. Poly Sci. Symposium No. 43, pp. 329-343 (1973).
[c]Inherent viscosity was determined in accordance wth U.S. 3,278,508, column 20, note a with the modification that the solution was not filtered through a sulfur absorption tube but rather a sample of the solution was filtered through a fritted glass filter stick of grade C porosity and pressured directly into the viscometer.
[d]Gel was determined in accordance with U.S. 3,278,508, col. 20, note b.
[e]Not recorded.
[f]Coupling efficiencies were calculated from gel permeation chromatography (GPC). Efficiency values were determined by measuring the height ofthe peak on the chromatograph for the residual parent polymer presentin the coupled product ($P_c$). This was then compared with the height of the peak for the parent polymer evaluated before coupling ($P_p$) and the efficiency calculated from coupling efficiency = 100 . ($P_p$ − $P_c$):$P_p$. The degree of coupling, i.e., the average number of polymer chains coupled per molecule of coupling agent, was determined by fixing the position of the GPC peak of the parent polymer obtained by the evaluation of the uncoupled parent polymer, determining the molecular weight at this count from calibration tables derived using the universal calibration curve as per G. Kraus and C. J. Stacy, J. Poly. Sci. Symposium No. 43, 329-343 (1973). Then the molecular weights for polymers containing two, three, four and more chains are calculated and the positions of these dichain, trichain and tetrachain (and higher) products on the chromatograph curve are also determined from the calibration tables and marked on the curves. The degree of coupling can then be estimated by interpolation of the thus calibrated GPC curve. A coupling degree of 6+ therefore refers to the fact that the peak of the GPC curve for the coupled polymer is located beyond the point of molecular weight corresponding to a six chain polymer.

The above shown data indicate 1,3,5-benzene tricarboxylic acid trichloride is a highly effective coupling agent for coupling lithium-initiated polymers polymerized in the presence or absence of tetrahydrofuran.

EXAMPLE III

This is a calculated example to demonstrate the way the coupled polymers can be hydrogenated. A sample of the coupled mixture obtained in accordance with Example II is taken prior to the addition of isopropyl alcohol or any other hydrogen donor. The sample is warmed to 70° C in a stirred reactor and 0.5 php nickel hydrogenation catalyst (preformed by reduction of nickel octanoate with triethylaluminum at a 2/1 mole ratio of nickel compound/aluminum compound) is added. The reactor is pressured to 50 psi (350 kPa) with hydrogen and maintained at 70° C for 3 hours with constant stirring. The reaction mixture is then treated with air and aqueous ammonium phosphate prior to filtration to remove catalyst residues. The solvent is removed by steam stripping and the polymer is recovered by filtration and drying. By this procedure, a considerable portion of the olefinic unsaturations of the coupled polymer are removed, which makes this polymer more resistant towards the attack of oxygen ozone.

Reasonable variations and modifications can be made in this invention without departing from the spirit and scope thereof.

I claim:
1. A polymer having the structure

$$A(Y')_{n-1}YR_{6-n} \quad (I)$$

wherein A represents a benzene ring, wherein the radicals R which can be the same or different, are selected from the group consisting of hydrogen and hydrocarbyl radicals with 1-6 carbon atoms per radical, the total number of carbon atoms in all R radicals being between 0 and about 10, wherein n is 2, 3 or 4, wherein the radicals Y' which can be the same or different, are selected from the group of radicals consisting of —Y and $$\overset{O}{\underset{\|}{-C}}-OR'',$$

wherein —Y is a radical selected from the group of radicals represented by the formulae

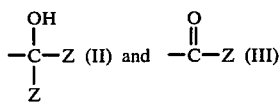

wherein R" is hydrogen or a hydrocarbyl radical having 1–10 carbon atoms and the radicals Z, which can be the same or different, are selected from the group consisting of polymer chains of one or more alkadienes having 4–12 carbon atoms and copolymer chains of one or more alkadienes having 4–12 carbon atoms and one or more monovinylarenes of 8–18 carbon atoms, having the vinyl radical attached to an arene ring carbon atom, said polymer chains being unhydrogenated or having at least a portion of the olefinic unsaturation thereof removed by hydrogenation, with the further provision that at least 160 polymer chains Z are present in 100 molecules of the formula (I).

2. A polymer in accordance with claim 1 wherein R" is an alkyl radical with 1–6 carbon atoms.

3. A polymer in accordance with claim 1 wherein the polymer chain Z is selected from the group consisting of homopolymers and copolymers of butadiene and isoprene and of copolymers of butadiene and/or isoprene with styrene and/or a methylstyrene and wherein R is hydrogen, $n$ is 3, and the three substituents Y and Y' are attached in 1, 3 and 5 position to the benzene ring A.

4. A polymer in accordance with claim 1 wherein the radicals Z have the structure A'—B'—, wherein A' is a polystyrene block and B' is a rubbery block obtained by polymerizing or copolymerizing an alkadiene selected from the group consisting of butadiene and isoprene.

5. A polymer having the structure $$A(Y')_{n-1}YR_{6-n} \qquad (I)$$

wherein A represents a benzene ring, wherein the radicals R which can be the same or different are selected from the group consisting of hydrogen and hydrocarbyl radicals with 1–6 carbon atoms per radical, the total number of carbon atoms in all R radicals being between 0 and about 10, wherein $n$ is 2, 3, or 4, wherein the radicals Y' which can be the same or different are selected from the group of radicals consisting of —Y and

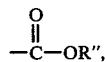

wherein —Y is the radical

wherein R" is hydrogen or a hydrocarbyl radical having 1–10 carbon atoms and the radicals Z which can be the same or different are selected from the group consisting of polymer chains of one or more alkadienes having 4–12 carbon atoms and copolymer chains of one or more alkadienes having 4–12 carbon atoms and one or more monovinylarenes of 8–18 carbon atoms, having the vinyl radical attached to an arene ring carbon atom, said polymer chains being unhydrogenated or having at least a portion of the olefinic unsaturation thereof removed by hydrogenation, with the further provision that at least 160 polymer chains Z are present in 100 molecules of the formula (I).

6. A polymer in accordance with claim 5 wherein R" is an alkyl radical with 1–6 carbon atoms.

7. A polymer in accordance with claim 5 wherein the polymer chain Z is selected from the group of homopolymers and copolymers of butadiene and isoprene and of copolymers of butadiene and/or isoprene with styrene and/or a methylstyrene and wherein R is hydrogen, $n$ is 3, and the three substituents Y and Y' are attached in 1,3, and 5 position to the benzene ring A.

8. A polymer in accordance with claim 5 wherein the radicals Z have the structures A'—B'—, wherein A' is a polystyrene block and B' is a rubbery block obtained by polymerizing or copolymerizing an alkadiene selected from the group consisting of butadiene and isoprene.

9. A polymer having the structure $$A(Y')_{n-1}YR_{6-n} \qquad (I)$$

wherein A represents a benzene ring, wherein the radicals R which can be the same or different are selected from the group consisting of hydrogen and hydrocarbyl radicals with 1–6 carbon atoms per radical, the total number of carbon atoms in all R radicals being between 0 and about 10, wherein $n$ is 2, 3, or 4, wherein the radicals Y' which can be the same or different are selected from the group of radicals consisting of —Y and

wherein —Y is the radical

wherein R" is hydrogen or a hydrocarbyl radical having 1–10 carbon atoms and the radicals Z which can be the same or different are selected from the group consisting of polymer chains of one or more alkadienes having 4–12 carbon atoms and copolymer chains of one or more alkadienes having 4–12 carbon atoms and one or more monovinylarenes of 8–18 carbon atoms, having the vinyl radical attached to an arene ring carbon atom, said polymer chains being unhydrogenated or having at least a portion of the olefinic unsaturation thereof removed by hydrogenation, with the further provision that at least 160 polymer chains Z are present in 100 molecules of the formula (I).

* * * * *